United States Patent [19]

Wendler et al.

[11] 4,110,886

[45] Sep. 5, 1978

[54] TOOL FOR REMOVING INJECTORS FROM DIESEL ENGINES

[76] Inventors: Gunter K. Wendler, 1031 Verdemar Dr., Alameda, Calif. 94501; Enrique Corpus, 17410 Langton Way, Hayward, Calif. 94541; Michael J. Ohannesian, 450 Maple Ave., Cotati, Calif. 94928

[21] Appl. No.: 753,892

[22] Filed: Dec. 23, 1976

[51] Int. Cl.$^2$ .............................................. B23P 19/04

[52] U.S. Cl. .......................................... 29/255; 29/280

[58] Field of Search ......................... 29/255, 280, 282; 403/328, 108

[56] References Cited

U.S. PATENT DOCUMENTS

| | | | |
|---|---|---|---|
| 2,474,360 | 6/1949 | Jimerson | 403/328 |
| 2,641,831 | 6/1953 | Helton | 29/255 |
| 2,721,090 | 10/1955 | Kamen | 403/328 |
| 3,118,696 | 1/1964 | Resare | 403/328 |
| 3,805,359 | 4/1974 | Webb | 29/282 |
| 3,945,104 | 3/1976 | Brookover | 29/255 |
| 3,972,104 | 8/1976 | Partin et al. | 29/280 |

*Primary Examiner*—James L. Jones, Jr.

*Attorney, Agent, or Firm*—Schapp and Hatch

[57] ABSTRACT

A tool for removing injectors from diesel engines having a working head proportioned to fit closely within the outer end of the central passage of a diesel injector and provided with a shoulder for limiting penetration thereinto. A transverse passage in the working head contains a spring-loaded pin having a stop to limit the distance by which the outer end of the pin projects beyond the cylindrical surface of the working head when the tool is not in use. In use, the spring-loaded pin is depressed to permit the outer end of the working head to be inserted into the central passage of the diesel injector until the shoulder bears against the diesel injector. The working head is replaceably carried on an elongated shaft, and a massive cylindrical driving member is slideable on the same shaft between a stop at the outer end of the shaft and the working head. The proportions are such that, when the working head is inserted into the diesel injector as far as the shoulder will permit; rotation of the tool about its axis brings the pin into alignment with a pre-existing bore in the wall of the diesel injector. Upon reaching such alignment, the pin is urged into the pre-existing bore by its spring, thus locking the tool to the injector so that the driven member can be repeatably struck against the driver stop to thus remove the injector from the diesel engine.

5 Claims, 5 Drawing Figures

TOOL FOR REMOVING INJECTORS FROM DIESEL ENGINES

BACKGROUND OF THE INVENTION

1. Field of the Invention

The present invention relates to tools for removing injectors from diesel engines, and more particularly to tools for removing injectors from diesel engines quickly and easily with no damage to the injector.

2. Description of the Prior Art

Hitherto injectors have been removed from diesel engines by means of tools which were not particularly adapted to the purpose, such as hammers, chisels, screwdrivers, spike bars, etc. This prior art procedure, or more properly lack of a definite procedure, resulted in a very great waste of time, labor, and money, and frequently resulted in damage to the injector.

SUMMARY OF THE INVENTION

Accordingly, it is an object of the present invention to provide a tool for removing injectors from diesel engines quickly and easily, and thus without waste of time, labor, and money.

Another object of the present invention is to provide a tool for removing injectors from diesel engines with no damage to the injectors.

A further object of the present invention is to provide a self-contained tool by means of which injectors can be removed from diesel engines without employing additional hammers, bars, levers, or the like.

Yet another object of the present invention is to provide a tool for removing injectors from diesel engines in which similar but differently dimensioned working heads are easily interchanged for removing different types of injectors from different diesel engines.

Other objects of the present invention will in part be obvious and will in part appear hereinafter.

The present invention, accordingly, comprises the features of construction, combination of elements, and arrangement of parts, which will be exemplified in the construction hereinafter set forth and the scope of the present invention will be indicated in the appended claims.

In accordance with a principal feature of the present invention a tool for removing injectors from diesel engines comprises a head having a cylindrical surface of such diameter as to closely fit within the outer end of the central passage of a diesel injector, said cylindrical surface extending between one end of said head and a shoulder located between said one end of said head and the opposite end of said head, said shoulder extending outwardly from said outer cylindrical surface.

In accordance with another feature of the present invention a pin is close-fittingly received in a transverse bore in the head, said transverse bore extending into the head from said cylindrical surface and being so located with respect to said shoulder that when said head is inserted into the outer end of the central passage of said diesel injector to the maximum extent permitted by said shoulder said transverse bore can be brought into alignment with the bore in the wall of said diesel injector by rotating said head about the axis of said cylindrical surface.

In accordance with yet another feature of the present invention the outward projection of said pin beyond said cylindrical surface is limited by limiting means, and said limiting means is removable through a longitudinal bore extending into said head, whereby said pin can be easily replaced.

In accordance with an additional aspect of the present invention said head is replaceably mounted on an elongated member which extends from said opposite end of said head when said head is mounted on the elongated member.

In accordance with a still further aspect of the present invention a driving member is slidably mounted on said elongated member and held captive thereon by means of a stop member affixed to the end of said elongated member opposite said head.

For a fuller understanding of the nature and objects of the present invention, reference should be had to the following detailed description, taken in connection with the accompanying drawings.

DESCRIPTION OF THE PREFERRED EMBODIMENT

Figure 1:
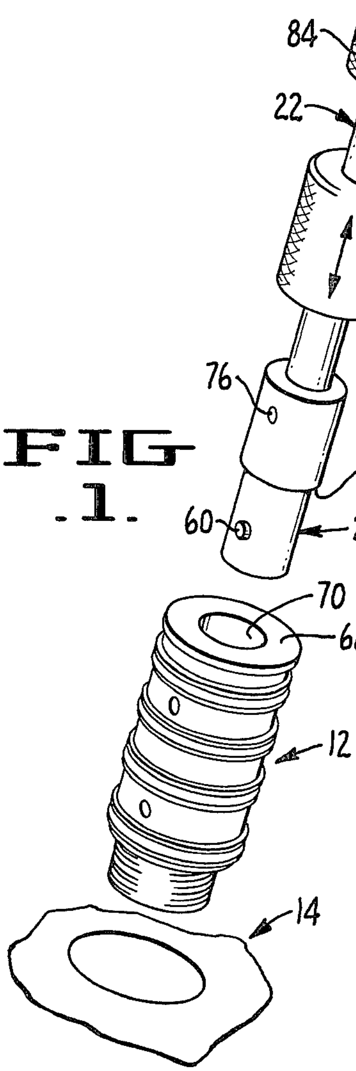
FIG. 1 is a perspective view of the diesel injector extracting tool of the present invention, a diesel injector such as would be removed by the tool of the present invention, and a fragmentary portion of the block of a diesel engine in which the injector is mounted for use.

Referring now to FIG. 1, there is shown a tool 10 for removing injectors from diesel engines embodying the present invention, and a cylindrical injector of the kind which tool 10 is adapted to extract from and install in a diesel engine 14 (shown in part only).

As also shown in FIG. 1, tool 10 generally comprises a working head 20, an elongated shaft 22, a stop 24 affixed to the opposite end of elongated shaft 22 from working head 20, and a massive driver or slide hammer 26 slidably mounted on elongated shaft 22.

Injector 12, may, for instance, be a Cummins Model PTD cylindrical injector, or the like, it being understood that working head 20 will in general be dimensioned to properly interengage with the particular model, or group of models, of injectors, and that several different working heads may be required if the tool of the invention is employed in a shop in which a wide variety of diesel engines is serviced.

Figure 2:
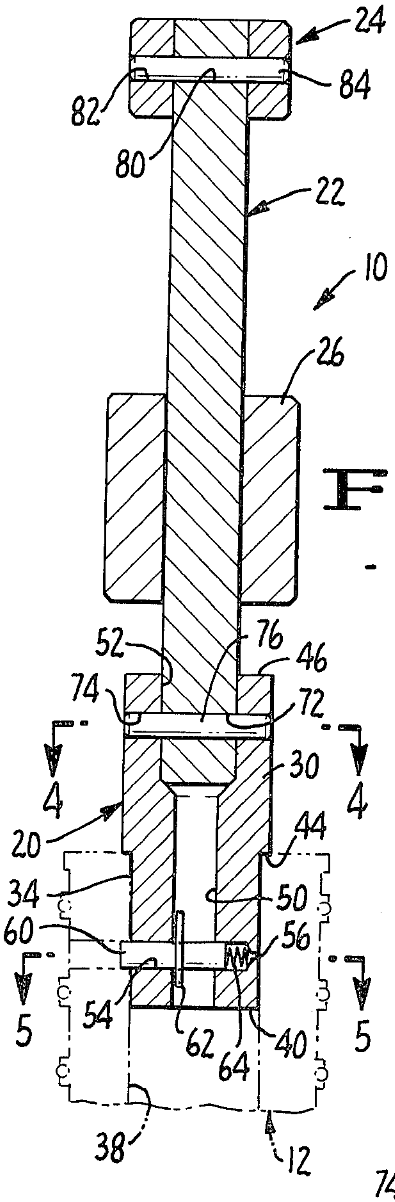
FIG. 2 is a central section view of the diesel injector extracting tool of FIG. 1.

Referring now to FIG. 2, it will be seen that working head 20 comprises a cylindrical main body 30 having at its outer end (lower end in FIG. 2) an outer cylindrical surface 34 which is of such diameter as to closely fit within the longitudinal, plunger-receiving passage 38 of injector 12.

As also seen in FIG. 2, cylindrical surface 34 extends from the outer end 40 of working head 20 to a shoulder 44 located between outer end 40 and inner end 46 of working head 20.

Figure 4:
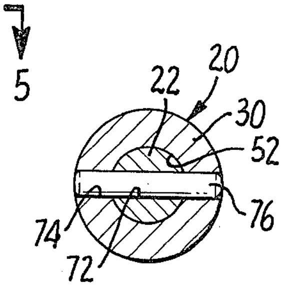
FIG. 4 is a sectional view taken on line 4—4 of FIG. 2.
Figure 5:
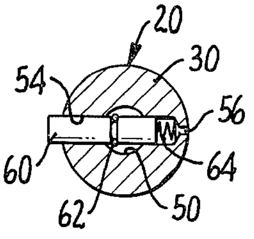
FIG. 5 is a sectional view taken on line 5—5 of FIG. 2.

As may be seen by comparison of FIG. 2 with FIGS. 4 and 5, a central, cylindrical passage 50 extends into head 20 from outer end 40, and a central, cylindrical passage 52 of larger diameter than passage 50 extends into head 20 from its inner end 46, passage 50 and passage 52 meeting within head 20 and together providing a complete passage from end to end of head 20.

As may be seen by comparison of FIGS. 2 and 5, a transverse bore 54 extends into head 20 through cylindrical surface 34 in a direction perpendicular to and intersecting the axis of cylindrical surface 34. Bore 54 extends through the axis of cylindrical surface 34, and therebeyond, terminating a short distance inside cylindrical surface 34. An air pressure relief hole 56 is provided at the inner end of bore 54, communicating directly to cylindrical surface 34. A pin 60 is disposed in bore 54, in which it is a close fit. The distance by which the outer end of pin 60 can project from bore 54 is limited by a spring clip 62, and pin 60 is resiliently urged outwardly, toward the limit set by spring clip 62, by a coil spring 64.

Figure 3:
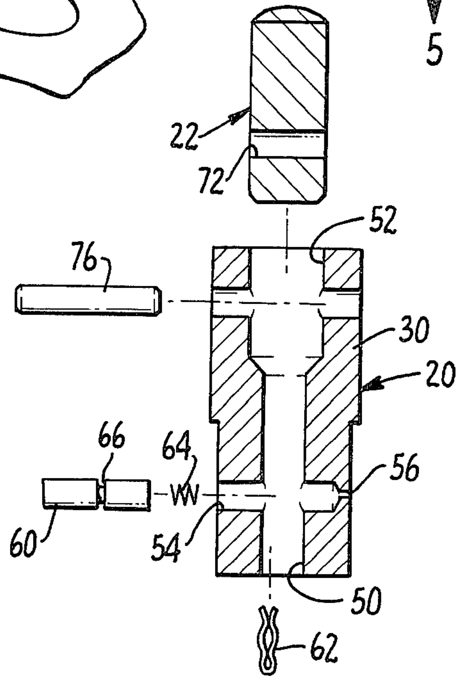
FIG. 3 is an exploded sectional view of the working head of the diesel injector extracting tool of FIG. 1.

As best seen in FIG. 3, pin 60 is provided with a central groove or depression 66. In assembling pin 60 and spring 64 into head 20, spring 64 is first dropped into bore 54, falling to the inner end of bore 54 adjacent air relief hole 56, and pin 60 is then dropped into bore 54. Pin 60 is then inserted into bore 54 and depressed, against the urging of spring 64, until groove 66 is located far enough within bore 50 to permit spring clip 62 to be inserted into bore 50 and resiliently locked in groove 66, the largest opening in spring clip 62, as shown in FIG. 3, embracing the bottom of groove 66.

The distance from shoulder 44 to the center of bore 54 is made equal to the distance between a radial fuel passage in cylindrical injector 12 and the outer end 68 of cylindrical injector 12 (FIG. 1). The outer diameter of pin 60 is made slightly smaller than the inner diameter of said radial fuel passage. Thus, it will be understood by those having ordinary skill in the art, informed by the present disclosure, that when tool 10 is inserted into the central, plunger-receiving passage 70 of injector 12 (FIG. 1) until shoulder 44 of head 20 contacts the outer end 68 of injector 12, and then tool 10 is rotated 360° or less about its axis, pin 60 will engage said radial fuel passage, locking tool 10 to injector 12.

As may be seen by comparison of FIGS. 2 and 4, one end of elongated, cylindrical shaft 22 closely fits within bore 52 in the inner end of working head 20. When elongated, cylindrical shaft 22 is bottomed on the shoulder between bore 50 and bore 52, a bore 72 (FIG. 3) extending through elongated shaft 22 can be brought into alignment with bore 74, which passes completely through working head 20. Shaft 22 is then affixed to working head 20 by means of a pin 76, which is of such diameter that it must be pressed into bores 72 and 74. Elongated shaft 22 is thus strongly and rigidly affixed to working head 20, but at the same time working head 20 may be removed from elongated shaft 22 to permit the replacement of working head 20 with a different working head adapted to coact with a different injector, without damaging either elongated shaft 22 or working head 20.

As may be seen in FIG. 2, a bore 80 is provided through the end of cylindrical shaft 22 opposite from bore 72. Driver stop 24 is provided with a bore 82 which is so located in driver stop 24 that bore 82 may be brought into registration with bore 80 to form a single, continuous passage of substantially uniform diameter extending through driver stop 24 and elongated shaft 22. When bores 80 and 82 are thus aligned to form a single continuous passage, driver stop 24 can be affixed to elongated shaft 22 by pressing a press fit pin 84 into said passage. As will be obvious to those having ordinary skill in the art, informed by the present disclosure, driver 26 will be passed over elongated shaft 22 and thus disposed slidably thereupon before driver stop 24 is affixed to elongated shaft 22. Similarly, when head 20 is removed for replacement driver 26 will be slidably disposed on elongated shaft 22 before the replacement head is affixed to shaft 22 by means of pin 76.

OPERATION OF THE TOOL

In using the tool of the present invention to remove, e.g., a Cummins Model PTD cylindrical injector from a diesel engine, the injector link, injector spring, plunger, etc., first having been removed from the injector, the outer end of working head 20 is first inserted into the outer end of the central plunger passage of the injector. Pin 60 is then pressed into bore 54 against the urging of spring 64 until the outer end of pin 60 is flush with cylindrical surface 34, whereupon the entire tool can be moved toward the engine block, thus inserting the outer end of working head 20 more deeply into the plunger passage of the injector, until shoulder 44 bears against the outer end 68 of the main injector body (FIG. 1). Thereupon, by rotating the tool about its axis while keeping shoulder 44 in contact with the outer end 60, 68 of the injector, bore 54 may be brought into alignment with one of the transverse fuel passages of the injector, i.e., one of the fuel passages which extend radially outward from the plunger passageway. When bore 54 and said one of the transverse fuel passages are thus aligned, the outer end of pin 60 will be thrust into the transverse fuel passage by the urging of spring 64 to the extent permitted by limit clip 62, it being understood that the distance of pin 60 from shoulder 44 and the diameter of pin 60 are so selected in a working head adapted to remove the Cummins PTD injector body from a diesel engine that pin 60 will be aligned with said transverse fuel passage and be thrust into said transverse fuel passage when the above-recited steps are carried out.

When working head 20 has thus been locked to injector 12, injector 12 may easily be removed from said diesel engine by reciprocating driver 26 and sharply impacting driver 26 against driver stop 24 with each reciprocation.

Once the injector has been removed from the engine with the aid of tool 10, tool 10 may be easily unlocked from the injector. For instance, when said transverse fuel passage extends to the outer face of the injector body, pin 60 may be pressed into bore 54 against the urging of spring 64 by means of a small punch or piece of drill rod inserted through said transverse fuel passage and brought to bear against the outer end of pin 60. When pin 60 is thus pressed into bore 54 a slight outward displacement of tool 10 will move bore 54 sufficiently out of registration with said transverse fuel passage so that the outer end of pin 60 bears against the wall of the plunger passage, whereafter tool 10 may be manually withdrawn from the injector by simply pulling outward on driver stop 24.

When, in the case of some injectors, the transverse fuel passage selected does not communicate to the outer surface of the injector body, pin 60 may be withdrawn from the transverse fuel passage by inserting a suitable tool through the inner end of the injector and into the open end of passage 50 in working head 20, whereupon this tool can be used to displace spring clip 62 against the urging of spring 64 and thus draw pin 60 into bore 54 until its outer end is flush with cylindrical surface 34.

An additional groove may, of course, be provided in pin 60 to accommodate such a tool.

It will be seen from the above, that the present invention provides a simple and efficient tool whereby injectors may be removed from diesel engines with a degree of ease, speed, and freedom from damage to the injector not hitherto accomplished.

It will thus be seen that the objects set forth above, among those made apparent from the preceding description, are efficiently attained, and, since certain changes may be made in the above construction without departing from the scope of the present invention, it is intended that all matter contained in the above description or shown in the accompanying drawings shall be interpreted as illustrative only, and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A tool for removing injectors from diesel engines, comprising:

a head having a cylindrical surface of such diameter as to closely fit within the outer end of the central passage of a diesel injector, said cylindrical surface extending essentially continuously between one end of said head and a shoulder located between said one end of said head and the opposite end of said head, said shoulder extending outwardly from said cylindrical surface;

a pin close-fittingly received in a transverse bore in said head, said transverse bore extending part way into said head from said cylindrical surface and being so located with respect to said shoulder that when said head is inserted into the outer end of the central passage of said diesel injector to the maximum extent permitted by said shoulder said transverse bore can be brought into alignment with a bore in said diesel injector by rotating said head about the axis of said cylindrical surface;

limiting means on said pin and in said bore formed for limiting the outward projection of said pin beyond said cylindrical surface; and spring means in said bore and compressed between said pin and the internal end of said bore for resiliently urging said pin toward its position of maximum projection from said cylindrical surface.

2. A tool as claimed in claim 1, further comprising:

an elongated member affixed to said head and extending axially said opposite end of said head;

a driving member slidably disposed on said elongated member; and a stop member affixed to said elongated member in such a position as to entrap said driving member between itself and said head, the distance between said opposite end of said head and said stop member being great enough so that said driving member can be reciprocatingly slid along said elongated member to repeatedly strike said stop member and thus extract said diesel injector from a diesel engine.

3. A tool as claimed in claim 1 in which said head is provided with a longitudinal bore extending from said one end thereof of a diameter sufficient to permit insertion of a probe tool therein and intersecting said transverse bore, and said limiting means is removable from its operative relationship with said pin by way of said longitudinal bore, whereby said pin may be removed and spring means replaced.

4. A tool as claimed in claim 2 in which said head is provided with a longitudinal bore extending from said one end thereof of a diameter sufficient to permit insertion of a probe tool therein and intersecting said transverse bore, and said limiting means is removable from its operative relationship with said pin by way of said longitudinal bore, whereby said pin may be removed and said spring means replaced.

5. A tool as claimed in claim 2 in which said head is replaceably affixed to said elongated member, whereby said head may be replaced by other heads the cylindrical surface diameters of which closely fit within other diesel injectors.

* * * * *